United States Patent [19]

Lehrfeld

[11] Patent Number: 5,734,031
[45] Date of Patent: Mar. 31, 1998

[54] CATION EXCHANGE RESIN

[75] Inventor: Jacob Lehrfeld, Peoria, Ill.

[73] Assignee: The United States of America as represented by the Secretary of Agriculture, Washington, D.C.

[21] Appl. No.: 533,416

[22] Filed: Sep. 25, 1995

[51] Int. Cl.[6] .......................... C08B 37/08; C08B 37/16; C01B 33/12; C07C 59/10
[52] U.S. Cl. .......................... 536/20; 536/56; 536/102; 536/103; 536/123.1; 536/124; 521/25; 521/38; 501/53; 423/335; 562/587
[58] Field of Search .......................... 536/20, 56, 102, 536/103, 123.1, 124; 521/25, 38; 423/335; 501/53; 562/587

[56] References Cited

U.S. PATENT DOCUMENTS 4,306,031  12/1981  Itagaki et al. .......................... 521/31
4,315,995  2/1982  Starks .......................... 521/33

OTHER PUBLICATIONS

J. Appl. Polym. Sci., vol. 57, No. 3, issued 1995, Lehrfeld et al, "The synthesis and properties of cation–exchange resin prepared by the pyrolysis of starch in the presence of phytic acid", pp. 385–390.

Primary Examiner—John Kight
Assistant Examiner—Everett White
Attorney, Agent, or Firm—M. Howard Silverstein; John D. Fado

[57] ABSTRACT

A new cation exchange resin is formed by mixing phytic acid with a material selected from the group consisting of polyhydroxy polymer, β-cyclodextrin and gluconic acid, and heating the mixture for about 130°–180° C. for about 15 minutes to 3 hours. A large number of different materials may be removed from solution by the resin including inorganic cations, organic pesticides and nitrogen bases.

28 Claims, 1 Drawing Sheet

CATION EXCHANGE RESIN

FIELD

The present invention pertains to new cation exchange resins and their production.

BACKGROUND

The use of ion exchangers is expected to increase in the foreseeable future. Resins for municipal water treatment, food and pharmaceutical product purification, process cleanup and metal recycling annually will require about 130 million pounds of anion and cation exchangers within a few years. The capacity of the ion exchange resin is the most important attribute for many of these applications. Nevertheless, the type of resin chosen for a particular application will be determined by a balance between stability, capacity, cost of manufacture, and special process requirements. Specificity is another important attribute of an ion-exchange resin.

SUMMARY

A new cation exchange resin has been produced by mixing phytic acid with a hydroxyl containing material selected from the group consisting of polyhydroxy polymers, gluconic acid and β-cyclodextrin and heating the mixture at a sufficient temperature, and for a sufficient time period, to form a cation exchange resin.

Phytic acid commonly is found as waste product from corn starch production. The incorporation of phytic acid with the hydroxyl containing material offers many possibilities. The phytic acid attaches to the hydroxyl containing material via a phosphate ester bond. Pure phytic acid has 6 phosphate groups. The attachment of one phytic acid molecule to the backbone of, for example, starch via a phosphate ester bond establishes a highly charged compact locus on the starch backbone having 11 exchangeable hydrogens. Because of the high density of phosphates, the modified starch polymer presents unique properties in terms of its selectivity for cations.

As used herein:

A. "Polyhydroxy polymers" means complex polysaccharide mixtures, pure polysaccharides, paper, synthetic polymers containing hydroxyl functionality and silica-based materials.

B. "Complex polysaccharide mixtures" is exemplified by agricultural residues from (a) corn bran, (b) corn cobs, (c) oat hull, (d) soy hull and (e) sugarbeet pulp.

C. "Pure polysaccharides" is exemplified by (a) starch (dent starch with amylose content of about 25% and granule size of around 15µ, amylomaize VII with an amylose content of about 70%, and rice starch with an amylose content of about 25% and a granule size of around 5µ), (b) cellulose (β-1-4-polymer of glucose units; powder, microcrystalline material, or fibers) and (c) chitin (a polysaccharide predominantly from marine invertebrates; unbranched chains of β-(1-4)-2-acetamido-D-glucose).

D. "Paper" is exemplified by (a) newsprint and (b) copy paper.

E. "Synthetic polymers containing hydroxyl functionality" is exemplified by polyvinyl alcohol.

F. "Silica-based materials" is exemplified by (a) powdered glass (silica gel 70–200µ particle size; silica used for column chromatography), (b) commercial silica and (c) celite (diatomaceous earth).

G. "Phytic acid" means pure phytic acid or commercial phytic acid.

H. "Commercial phytic acid" means a complex mixture of pure phytic acid, i.e., inositol with six phosphate groups, and its hydrolysis product, i.e., inositol with 5, 4, 3, 2, and 1 phosphate groups.

I. "Commercial phytic acid solution" means an aqueous solution, about 40–50 weight percent solids, of commercial phytic acid.

J. "Pure phytic acid" means myoInositol-1,2,3,5/4,6-hexakis (dihydrogen phosphate) as illustrated in FIG. 1. Its formula is $C_6H_{18}O_{24}P_6$ and it has a molecular weight of 660.08. Its alkali metal salts are soluble while most other metal salts tend to form insoluble chelates. The 6-membered ring assumes the typical chair formation, as shown in FIG. 1. Because of a complex series of interactions the conformation of the ring flips as one goes from acid to basic solution. In acid solutions the phosphates are 5 equatorial and 1 axial (5e, 1a) while in strongly basic solutions the conformation is 5 axial and 1 equatorial (5a, 1e). The crystalline dodecasodium salt also exists in 5a, 1e conformation. With further regard to "pure phytic acid," the phosphate groups are in close proximity to each other and interact. This interaction accounts for the marked differences in pKa. The diassociation constants for the first six hydrogens are similar. They have an average pKa of 1.84. The next 2 hydrogens have an average pKa of 6.30 and the last 4 have an average pKa of 9.7.

With still further regard to "pure phytic acid," because the molecule has a plane of symmetry it has no optical activity. However, many of the partially dephosphorylated isomers are optically active. There are 63 possible isomers (IP-6, IP2-15, IP3-20, IP4-15, IP5-6 and IP6-1).

It is an object of the present invention to produce cation exchange resins that are able to extract many materials from solution including the following:

a. inorganic cations such as $Cu^{+2}$, $Cr^{+3}$, $Ag^{+1}$, $La^{+3}$, $Fe^{+3}$, $Ca^{+2}$, $Cd^{+2}$, $Pb^{+2}$, $Mg^{+2}$, $Zn^{+2}$.

b. organic pesticides such as atrazine.

c. nitrogen bases such as ammonia.

Another object is to establish new uses for agricultural residues with minimal commercial value and a waste disposable problem.

A further object is to employ the silica-based materials of the present invention to pick up radioactive elements from fission waste products and thereafter vitrify the material, so that it may be made into mox fuel and "burned" in reactors, or stored as stable glass slag material.

DETAILED DESCRIPTION

Figure 1:
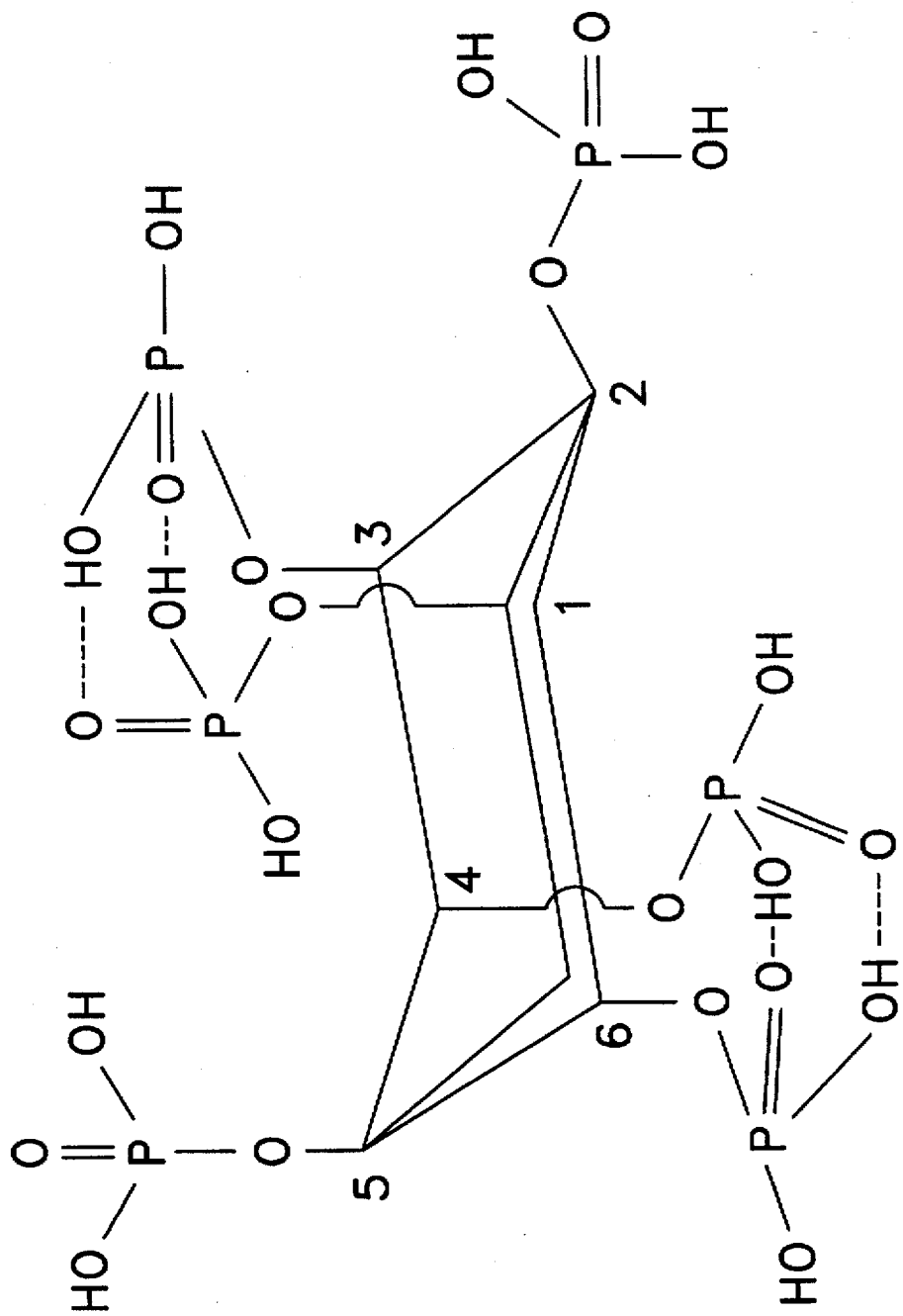
FIG. 1 illustrates phytic acid.

Production of the ion exchange resin of the present invention is comparatively simple. Polyhydroxy polymer, β-cyclodextrin or gluconic acid is suspended in a medium such as water or methanol and thereafter mixed with phytic acid such as commercial phytic acid solution.

Subsequently, the suspension is heated to drive off any liquid and to heat the dried material to an appropriate elevated temperature to effectuate the attachment of the phytic acid molecules to the polyhydroxy polymer, β-cyclodextrin, or gluconic acid. Wet or dry heating may be employed.

In the commercial production of the cation exchange resin of the present invention, the suspension may be spray dried and then heated in a large reactor under vacuum (e.g., 20 mm Hg) or at atmospheric pressure. Extruding equipment may be employed for continuous operations.

Typical parameters for making the product of the present invention are as follows:

volume of phytic acid solution to weight of hydroxyl containing material: about 1–10 ml of (a) commercial phytic acid solution (contains about 30–40 weight % pure phytic acid) or (b) about 40 weight % pure phytic acid solution per 10 grams of hydroxyl containing material; preferred, about 4–6 ml per 10 grams.

parts by weight pure phytic acid per parts by weight hydroxyl containing material: about 0.2–2 grams pure phytic acid per 10 grams hydroxyl containing material; preferably about 0.8–1.3 grams pure phytic acid per 10 grams hydroxyl containing material.

weight of hydroxyl containing material per volume of suspending agent (e.g., water of methanol): about one gram solids per 1–3 ml suspending agent (more suspending agent requires more drying time, and less suspending agent may not suspend the solids).

mixing time for slurry and phytic acid solution: about 5–10 minutes, and then let sit an additional several minutes.

drying temperature and pressure:

methanol diluent: about 40°–70° C., about 20–760 mm Hg water diluent: about 50°–70° C., about 20–30 mm Hg
heating temperature after drying:
about 130°–200° C. broad,
about 175°–185° C. preferred
heating time after drying:
at 130°: about 1–3 hr. broad, about 1¾–2¼ hr prfd
at 200°: about 15–30 min. broad, about 15–20 min. prfd
heating pressure:
about 20–760 mm Hg broad,
about 20–50 mm prfd Small batches of the product of the present invention may be prepared easily as illustrated by the following examples.

EXAMPLE 1

Starch (100 g) was suspended in a solution comprised of 100 ml methanol and 25 ml of commercial phytic acid solution. The solution contained 560 mg solids/ml. Water and methanol were removed under reduced pressure, and the residue was dried in a heated vacuum oven (85° C.) for 16 hours. The powder was mixed in a Waring blender to ensure homogeneity. Ten grams of powder in a 500 ml round bottom flask were placed in an agitated, preheated Kugelrohr distillation apparatus (135° C.) under vacuum (water aspirator) for 20 minutes to 3 hours. The dark brown to black residue that formed was washed with 200 ml water, filtered, and then washed with 100 ml methanol. The yields of air-dried solids were 4.2–7.6 g.

EXAMPLE 2

Starch (10 g) was suspended in 50 ml of water or methanol in a 500 ml round bottom flask. Variable amounts of the aqueous phytic acid solution were added to the suspension. Solvent was removed on a rotary evaporator under reduced pressure. The flasks were placed in an agitated preheated Kugelrohr (180°) under vacuum for 20 minutes. The residue was treated as described in Example 1. The yields of air-dried solids were 3.6–15.0 g.

Whatever substrate compound is selected, one readily will be able to determine appropriate operating conditions to make the product of the present invention at least in small batches. For example, with regard to the use of starch as a polyhydroxy polymer, at a heating temperature of 135° C., maximal ion-binding capacity was achieved with a heating period of about 2 hours. Photomicrographs show an interesting transition from 1 to 2 hours. After 1 hour, discrete granules are still visible. They are somewhat distorted in that many have caved-in centers. After 2 hours, many of these granules coalesced. With regard to the use of starch as the polyhydroxy polymer, it is believed that heating to coalescence is necessary to achieve maximum activity, but this does not necessarily hold for other types of polyhydroxy polymers.

As to products made with starch, tests have shown that at a temperature of 180° C. for 20 minutes under vacuum, a good balance is attained between yield (grams of resin obtained), ion-binding capacity of resin, and time or reaction. For example, a mixture containing 10 g of starch and 10 ml of phytic acid solution gave 10.2 g of resin having an ion-binding capacity of 3.96 meq/g. When the temperature was raised 20° C., the yield of resin fell by 18% and the ion-binding capacity of the resin fell by 25%.

The use of vacuum also may effect optimum activity. For instance, a series of starch-based resins were prepared at 140° C. with and without vacuum. Resins prepared in vacuum consisted of fine particles with a density of 0.51 g/ml, while those prepared at atmospheric pressure were in the form of a large cluster having the appearance of popped corn with a density of 0.063 g/ml. The latter's weight, yields and ion-binding capacity were reduced by about two-thirds in comparison to the resin prepared under vacuum.

An increase in the ratio of phytic acid to starch results in the production of a resin with increased ion binding capacity, but the response is not linear. For example, the resin produced from a 1:1 mixture (10 g starch, 10 ml commercial phytic acid solution) at 180° C. had an ion-binding capacity of 3.96 meq/g, while the resin produced from a 1:2 mixture (10 g of starch, 20 ml of commercial phytic acid solution) had a ion-binding capacity if 5.79 meq/g. The granular structure of starch is lost in those resins having high binding capacities.

The stability of starch-based resins having a ion exchange capacity of 1.29 meq/g and a discrete granular structure was quite good. After being heated with 2N HCL at 130° C. for 5 hours in a sealed tube, 70% of the material was recovered and the loss of ion-binding capacity was only 25%.

With regard to carbohydrate polyhydroxy polymers, the heating step of the present invention produces highly branched monomeric units without extensively degrading the monomeric unit, and lowers the molecular weight of such units. It is believed that the phytic acid actually catalyzes these effects and causes the formation of ester bonds between the phytic acid and the polymer, resulting in a greatly branched and extensively crosslinked (with phytic acid) backbone.

The above types of tests readily may be employed to determine optimum parameters with regard to hydroxyl containing material other than starch.

The following table shows exchange capacity test results with a number of resins of the present invention.

TABLE 1

| Material Mixed with Phytic Acid | Exchange Capacity of Resin for Calcium, Microequivalents/gram |
| --- | --- |
| corn bran | 3630 |
| corn cob | 1920 |
| oat hull | 1220 |
| soy hull | 1720 |
| sugarbeet pulp | 3385 |
| starch (dent) | 5504 |
| starch (amylomaize VII) | 5700 |
| starch (rice) | 4860 |
| cellulose | 5410 |
| chitin | 2130 |
| paper (newsprint) | 3800 |
| paper (copier) | 2620 |
| poly (vinyl alcohol) | 785 |
| powdered glass | 1850 |
| commercial silica | 1800 |
| celite | 1700 |
| β-cyclodextrin | 3540 |
| gluconic acid (as sodium gluconate) | 2540 |

I claim:

1. A cation exchange resin comprising the reaction product of a mixture of phytic acid and a hydroxyl containing material selected from the group consisting of polyhydroxy polymer, β-cyclodextrin and gluconic acid, wherein said mixture has been heated at a sufficient temperature, and for a sufficient time period, to form a cation exchange resin.

2. The resin of claim 1 wherein said hydroxyl containing material is β-cyclodextrin.

3. The resin of claim 1 wherein said hydroxyl containing material is gluconic acid.

4. The resin of claim 1 wherein said mixture comprises about 0.2–2 parts by weight of pure phytic acid per 10 parts by weight of said hydroxyl containing material.

5. The resin of claim 4 wherein said hydroxyl containing material is polyhydroxy polymer and said polymer is selected from the group consisting of complex polysaccharide mixtures, pure polysaccharides, paper, synthetic polymers containing hydroxyl groups, silica-based material and mixtures thereof.

6. The resin of claim 5 wherein said polyhydroxy polymer comprises a complex polysaccharide mixture contained in agricultural residues.

7. The resin of claim 6 wherein said complex polysaccharide mixture comprises a material selected from the group consisting of corn bran, corn cobs, oat hull, soy hull, sugarbeet pulp and mixtures thereof.

8. The resin of claim 5 wherein said polyhydroxy polymer comprises pure polysaccharide.

9. The resin of claim 8 wherein said pure polysaccharide comprises a material selected from the group consisting of starch, cellulose, chitin, and mixtures thereof.

10. The resin of claim 5 wherein said polyhydroxy polymer comprises paper.

11. The resin of claim 10 wherein said paper comprises a material selected from the group consisting of newsprint, copy paper and mixtures thereof.

12. The resin of claim 5 wherein said polyhydroxy polymer comprises a synthetic polymer containing hydroxyl groups.

13. The resin of claim 12 wherein said synthetic polymer comprises poly(vinyl alcohol).

14. The resin of claim 5 wherein said polyhydroxy polymer comprises silica-based materials.

15. The resin of claim 14 wherein said silica-based material comprises a material selected from the group consisting of powdered glass, commercial silica, celite and mixtures thereof.

16. A process for producing cation exchange resin comprising mixing phytic acid and a hydroxyl containing material selected from the group consisting of polyhydroxy polymer, β-cyclodextrin and gluconic acid, and heating the mixture to a sufficient temperature, and for a sufficient time period, to form a cation exchange resin.

17. The process of claim 16 wherein said hydroxyl containing material is polyhydroxy polymer and said mixture comprises about 0.2–2 parts by weight of pure phytic acid per 10 parts by weight of said polymer.

18. The process of claim 16 wherein said hydroxyl containing material is polyhydroxy polymer and said polymer is selected from the group consisting of complex polysaccharide mixtures containing in agricultural residues, pure polysaccharides, paper, synthetic polymers containing hydroxyl groups, silica-based materials and mixtures thereof.

19. The process of claim 18 wherein said polyhydroxy polymer comprises a complex polysaccharide mixture contained in agricultural residues.

20. The process of claim 19 wherein said complex polysaccharide mixture comprises a material selected from the groups consisting of corn bran, corn cobs, oat hull, soy hull, sugarbeet pulp and mixtures thereof.

21. The process of claim 18 wherein said polyhydroxy polymer comprises pure polysaccharide.

22. The process of claim 21 wherein said pure polysaccharide comprises a material selected from the group consisting of starch, cellulose, chitin, and mixtures thereof.

23. The process of claim 18 wherein said polyhydroxy polymer comprises paper.

24. The process of claim 23 wherein said paper comprises a material selected from the group consisting of newsprint, copy paper and mixtures thereof.

25. The process of claim 18 wherein said polyhydroxy polymer comprises a synthetic polymer containing hydroxyl groups.

26. The process of claim 25 wherein said synthetic polymer comprises poly(vinyl alcohol).

27. The process of claim 18 wherein said polyhydroxy polymer comprises silica-based materials.

28. The process of claim 27 wherein said silica-based material comprises a material selected from the group consisting of powdered glass, commercial silica, celite and mixtures thereof.

* * * * *